(12) United States Patent
Jasper et al.

(10) Patent No.: US 7,978,132 B2
(45) Date of Patent: Jul. 12, 2011

(54) GPS SIGNAL DATA CONVERTER FOR PROVIDING GPS SIGNALS TO A PLURALITY OF CONNECTION PORTS

(75) Inventors: Kevin Louis Jasper, Fords, NJ (US); Michael Banks, Columbia City, IN (US); Mark Wulffert, Middletown, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 253 days.

(21) Appl. No.: 12/403,615

(22) Filed: Mar. 13, 2009

(65) Prior Publication Data

US 2009/0278739 A1 Nov. 12, 2009

Related U.S. Application Data

(60) Provisional application No. 61/036,710, filed on Mar. 14, 2008.

(51) Int. Cl.
*G01S 19/36* (2010.01)
*G01S 19/37* (2010.01)
(52) U.S. Cl. .......... 342/357.76; 342/357.56; 342/357.77
(58) Field of Classification Search ............. 342/357.51, 342/357.52, 357.56, 357.75, 357.76, 357.77; 361/728–735
See application file for complete search history.

(56) References Cited

U.S. PATENT DOCUMENTS

| | | | |
|---|---|---|---|
| 5,519,403 A * | 5/1996 | Bickley et al. | 342/352 |
| 6,426,872 B1 * | 7/2002 | Sutton et al. | 361/679.41 |
| 6,674,400 B1 | 1/2004 | Hynes | |
| 6,683,867 B1 | 1/2004 | DeWulf | |
| 6,844,846 B1 * | 1/2005 | Riday | 342/357.52 |
| 7,031,309 B1 * | 4/2006 | Sautter et al. | 370/392 |
| 2002/0188776 A1 | 12/2002 | Houlberg | |
| 2006/0074556 A1 | 4/2006 | Hoiness et al. | |
| 2009/0055034 A1 * | 2/2009 | Houlberg | 701/3 |

FOREIGN PATENT DOCUMENTS

EP 1640941 A 3/2006

OTHER PUBLICATIONS

European Search Report and Opinion, dated May 28, 2009, 5 pages.

* cited by examiner

*Primary Examiner* — Thomas H Tarcza
*Assistant Examiner* — John B Vigushin
(74) *Attorney, Agent, or Firm* — Edell, Shapiro & Finnan, LLC (57) ABSTRACT

A global positioning system (GPS) signal data converter device includes a plurality of output ports configured to connect with and transmit GPS information to devices connected with the output ports, and a processor configured to receive GPS information in a first format, convert the GPS information from the first format into a second format, and to transmit the GPS information to at least two output ports in the first and second formats.

22 Claims, 5 Drawing Sheets

GPS SIGNAL DATA CONVERTER FOR PROVIDING GPS SIGNALS TO A PLURALITY OF CONNECTION PORTS

CROSS REFERENCE TO RELATED APPLICATIONS

This application claims priority under 35 U.S.C. §119(e) from U.S. Provisional Patent Application Ser. No. 61/036,710, filed Mar. 14, 2008, and entitled "GPS Signal Data Converter and Fan-Out Box," the entire contents of which are hereby incorporated by reference.

BACKGROUND

Many platforms, such as mobile vehicles used in combat and other military operations, require global positioning system (GPS) input data in two or more formats. For example, different systems on the platform may require different formats, such as Lat/Long, MGRS, UTM, etc. Current GPS devices output a maximum of two different formats at one time. However, many platforms have three or more GPS devices installed on the vehicles to meet operational needs. The need for GPS input in various formats is increasing due to the introduction of new Combat Identification and Situational Awareness systems.

In addition, providing additional GPS capabilities to existing legacy communication equipment, such as radios used in the field, would require redesign and replacement of the original equipment. Installation of the replacement system, with the necessary platform modifications, requires the platform served by the communication system be taken out of service and returned to a depot maintenance facility for the work to be performed. It would therefore be further desirable to provide an expansion module for connection with an existing communication system providing GPS information that expands the functionality of the communication system so as to provide GPS information in multiple (e.g., three or more) formats to auxiliary devices connected with the communication system.

SUMMARY

In accordance with the present invention, a global positioning system (GPS) signal data converter device comprises a plurality of output ports configured to connect with and transmit GPS information to devices connected with the output ports, and a processor configured to receive GPS information in a first format, convert the GPS information from the first format into a second format, and to transmit the GPS information to at least two output ports in the first and second formats.

In accordance with another embodiment of the invention, a communications system for providing global positioning system (GPS) information comprises an electronic component including a GPS receiver that provides GPS information in a first format, and a GPS signal data converter (SDC) device connected with the electronic component and comprising a plurality of output ports configured to connect with and transmit GPS information to devices connected with the output ports, and a processor configured to receive GPS information in the first format from the electronic component, convert the GPS information from the first format into at least a second format, and to transmit the GPS information to at least two output ports in the first and second formats.

In a further embodiment of the invention, a method is described for providing global positioning system (GPS) information in a plurality of different formats based upon GPS information received in a single format from a GPS receiver. The method comprises providing GPS information in a first format to a processor of a GPS signal data converter (SDC) device, converting the GPS information via the processor from the first format into a second format using the processor of the GPS SDC device, and simultaneously transmitting the GPS information in the first format to a first output port of the GPS SDC device and the GPS information in the second format to a second output port of the GPS SDC device.

The GPS SDC device provides a number of advantages including, without limitation, the advantage of simultaneously providing GPS information to a number of different devices (e.g., at least one device, and as many as six or more different devices) in a number of different formats (e.g., two different formats, or even three or more different formats).

The above and still further features and advantages of the present invention will become apparent upon consideration of the following detailed description of a specific embodiment thereof, particularly when taken in conjunction with the accompanying drawings wherein like reference numerals in the various figures are utilized to designate like components.

DETAILED DESCRIPTION

In accordance with the present invention, a global positioning system (GPS) signal data converter (SDC) device is provided which takes the output of a PVT (position, velocity, & time) solution from an internal or external GPS-based and/or GPS-aided source and formats the signal out as GPS information to a plurality of ports. Each port has the ability to output a different message format such that a plurality of different formats, for example, can be output simultaneously.

The GPS SDC device can be configured in multiple variations. For example, the device can connect directly to any system or, alternatively, it can be configured as a standalone device. When the device is attached as a module to an existing device, such as a radio, for example, the device has a port to accept GPS information and/or power directly from the attached radio. When the GPS SDC device is used in the standalone configuration, the device uses position and time information via an internal embedded GPS receiver (e.g., in the form of a card) and/or an inertial navigation subsystem. In the standalone embodiment, power can be provided via an external cable or can be provided by another device to which the GPS SDC device may be connected. Alternatively, the GPS SDC device can also be configured to operate in a manpack configuration.

In all variations, the GPS SDC device contains a processor that controls multiple serial ports. When a device is connected to any of these serial ports, a "handshaking" process is initiated to tell the processor what message format is required on that port. The processor sends the GPS information to each port as requested by the device attached to each port.

Figure 1:
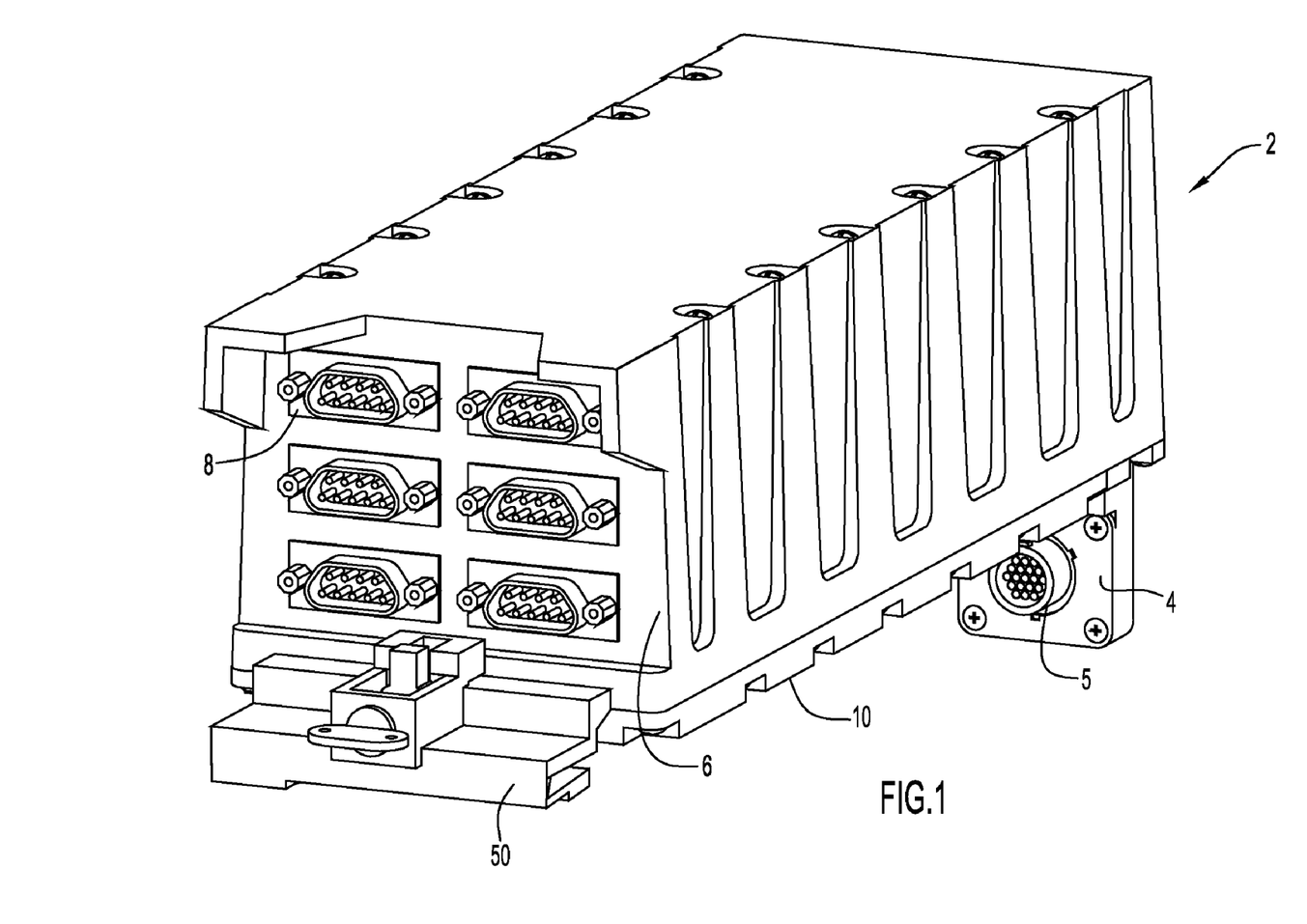
FIG. 1 is a view in perspective of an exemplary embodiment of a GPS signal data converter device in accordance with the present invention.

An example embodiment of a GPS SDC device of the present invention is depicted in FIG. 1. The GPS SDC device 2 of FIG. 1 is configured to connect to another device (such as a radio) via a connection port 5 disposed on a mounting plate 4 located at or near a rear surface of the device. The GPS SDC device 2 includes a front surface 6 with six serial ports 8 connected at the front surface and configured to connect with different devices to simultaneously provide GPS signal data (also referred to herein as GPS information) having different formats to each of the serial ports. Examples of different GPS formats that can be provided by the GPS SDC device to the serial ports include a latitude/longitude (Lat/Long) format, a Military Grid Reference System (MGRS) format, and a Universal Transverse Mercator (UTM) format. Other formats can also be provided and/or added to the device (e.g., via software downloads or updates). The serial ports are configured as high density fifteen pin female serial ports that connect with corresponding fifteen pin male connectors for auxiliary devices. Alternatively, the GPS SDC device can include serial ports having any other suitable configuration and also fewer or additional serial ports (e.g., less than or more than six serial ports) depending upon a particular application. Preferably, the GPS SDC device includes at least three serial ports, and preferably at least six serial ports, such that the GPS SDC device is configured to simultaneously provide GPS information to all available ports in three or more different formats. For example, the device 2 of FIG. 1 can be configured to simultaneously provide GPS information in a different format to each port 8.

A connection bracket 50 is attached to a side edge portion of the front surface, and the bracket 50 facilitates connection with another device such as a radio as described below. However, as noted above, the GPS SDC device can also be configured as a standalone unit, in which case no connection bracket and rear connection port (to facilitate connection with a radio or other electronic device) are required.

In one embodiment, the GPS SDC device 2 is configured as an expansion module that is particularly suitable for connection with an existing communication or radio unit that is secured or mounted in an existing structure (e.g., a mobile vehicle) such that the expansion module and communication unit exchange data. However, it is noted that the expansion module can be suitably configured to mechanically and electrically connect with any communication and/or other electronic device (e.g., via a connection bracket as shown in the figures and/or via any other suitable attachment mechanism) so as to facilitate electrical connection and/or communication between the expansion module and device to which it is connected and enhanced performance and operability of such device. When connected to another electronic device, the GPS SDC device can be configured to receive GPS information from the other electronic device, power from the other electronic device or both GPS information and power from the electronic device.

In one particular embodiment, the GPS SDC expansion module enhances an existing or legacy communication system employing Single Channel Ground and Airborne Radio System (SINCGARS), such as a Single Channel Ground and Airborne Radio System Advanced Improvement Program-Enhanced (SINCGARS ASIP-E) radio, while utilizing the existing platform interfaces. The expansion module is configured to mount to the current SINCGARS radio (e.g., within a conventional shock isolation mount disposed within a military vehicle), where the expansion module shares a conditioned DC power source used by the SINCGARS radio. The expansion module is configured to connect with the SINCGARS radio in a relatively easy manner and in such a way that the expansion module can be installed in the field, requiring only a short time to add the module.

Figure 2:
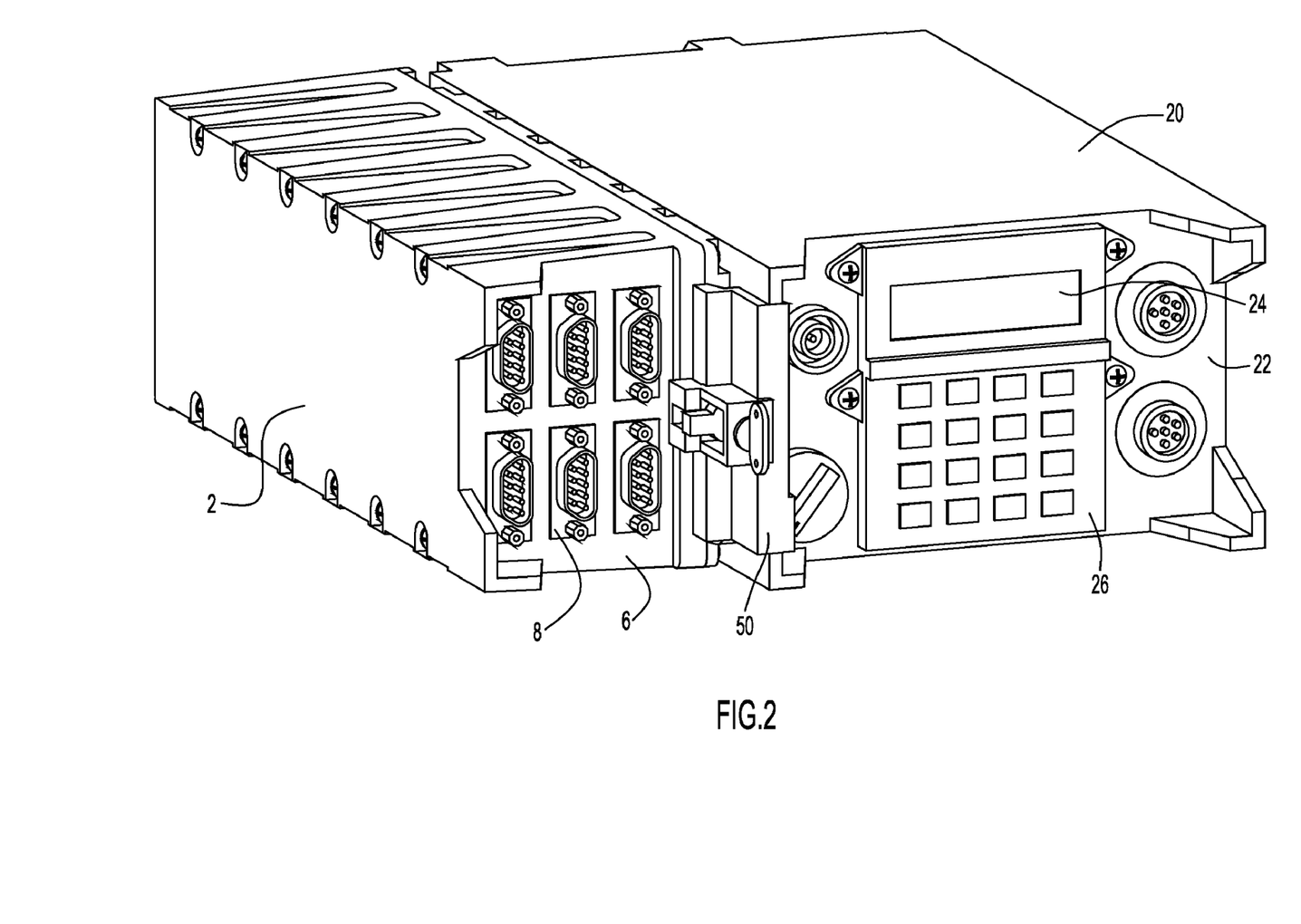
FIG. 2 is a view in perspective of the GPS signal data converter device of FIG. 1 connected as a side module to a SINCGARS radio.
Figure 3:
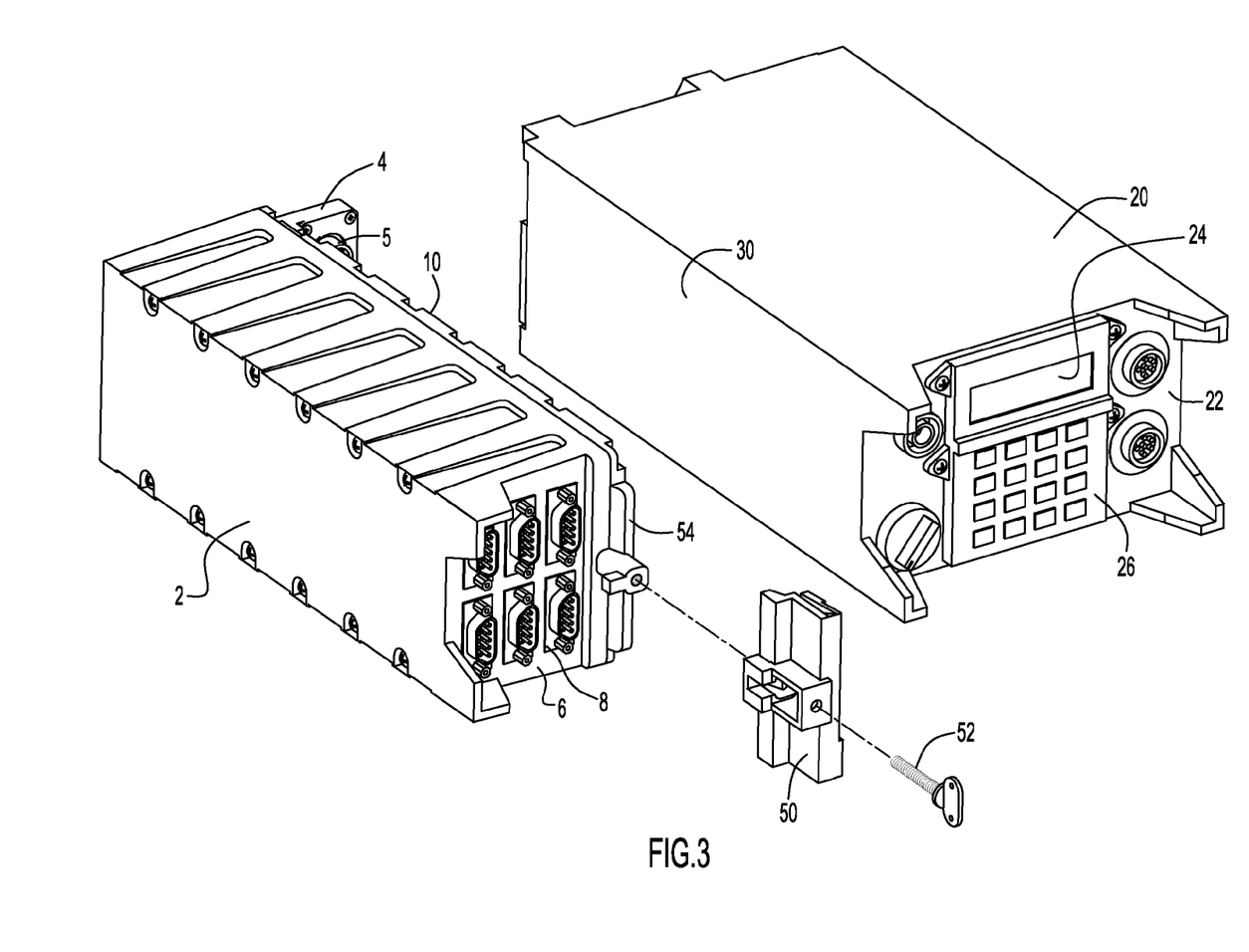
FIG. 3 is a partially exploded view in perspective of the GPS signal data converter device and SINCGARS radio and also a connector that facilitates connection with a corresponding connector of the radio.

An exemplary embodiment of the GPS SDC device configured as an expansion module, also referred to herein as a "sidehat" module, for a SINCGARS radio is depicted in FIGS. 2 and 3, where the GPS SDC sidehat module 2 electrically and mechanically fastens or connects to a SINCGARS RT-1523F ASIP radio 20 using suitable connection equipment. Referring to FIG. 2, the SINCGARS radio 20 includes a front panel 22 that includes a suitable electronic display 24 and a user input interface including a touch key pad 26 that includes input keys to facilitate control and operability of the radio by a user, as well as a power and control switch and various data ports configured to connect with other components for exchanging data.

Referring to FIG. 3, the radio 20 and GPS SDC sidehat module 2 connect with each other such that corresponding sidewalls 10 and 30 of these two components engage with each other as the two units are connected together at their adjoining front panel edge portions using bracket 50. The connection between a sidehat module and radio using a bracket and corresponding securing structure disposed on the sidehat module is described in detail in U.S. patent application Ser. No. 11/617,778, filed Dec. 29, 2006, the disclosure of which is incorporated herein by reference in its entirety. Briefly, the sidehat module 2 connects with the radio using the clamp 50 and a thumbscrew 52 that secure to the adjacent front edge portions of the module 2 and radio 20, where securing structure 54 is disposed at a front edge of module 2 and includes a threaded recess into which the thumbscrew 52 is threaded to engage the clamp 50 with the module and radio.

The GPS SDC sidehat module 2 includes a mounting plate 4 extending transversely from sidewall 10 of the module at a rear and upper location of the module such that a rear surface of the mounting plate is generally coplanar with a rear panel of the module. A data connector or connection port 5 is disposed on and extends from a front surface of mounting plate 4 in a direction toward the front panel 6 of the module. The connection port 5 of GPS SDC sidehat module 2 is configured to engage with a corresponding data connector or connection port at the rear panel of radio 20 when the sidewalls 10 and 30 of the module 2 and radio 20 are forced together and the module 2 is slid forward slightly with respect to the radio 20. This connection provides a single, easily engaging physical interface between the module 2 and the radio 20. The connector 5 on mounting plate 4 of the GPS SDC sidehat module 2 can be, e.g., a circular connector including 19 electrical pins or contacts to engage with a corresponding connection port or connector having a similar 19 electrical contact arrangement and disposed on the rear panel of the radio 20. An example embodiment of electrical connecting structure for connecting a sidehat module to a radio at their rear panels or surfaces is described in U.S. Pat. No. 7,422,486, the disclosure of which is incorporated herein by reference in its entirety.

Figure 4:
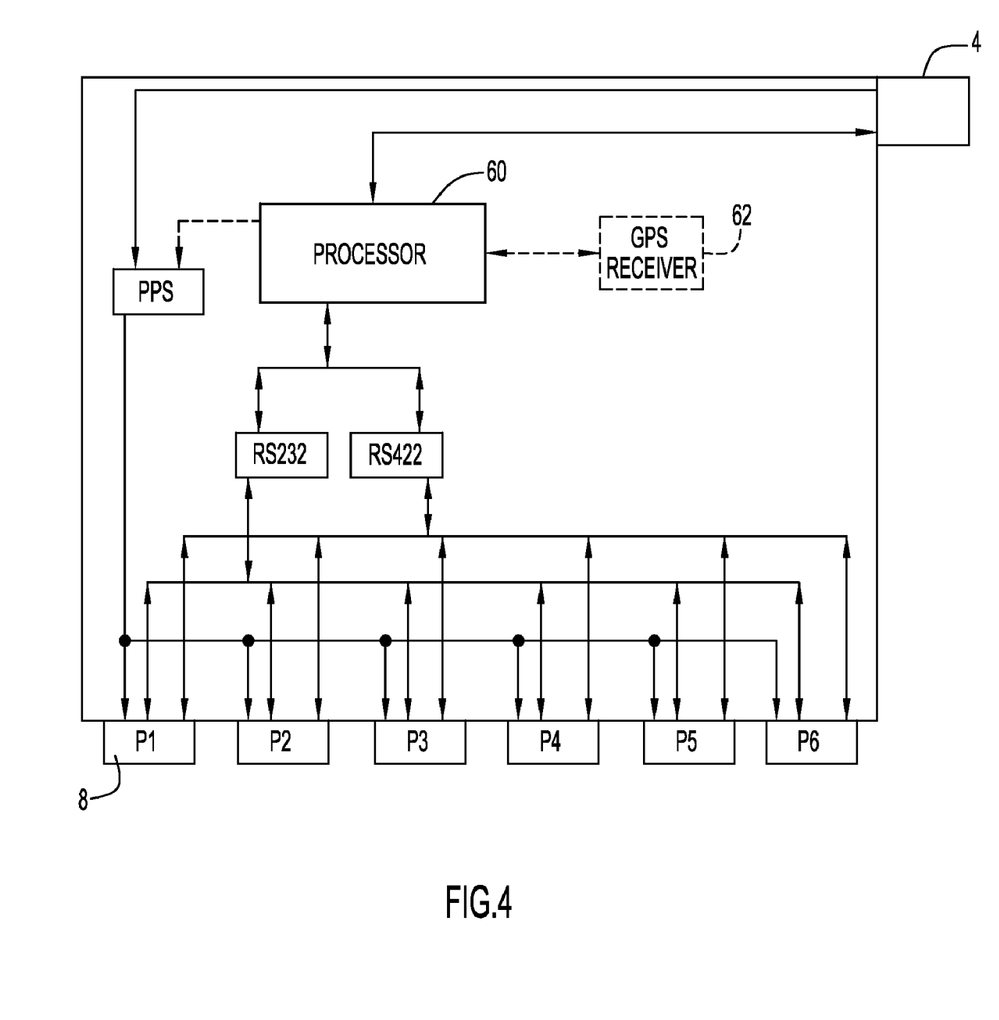
FIG. 4 depicts a functional block diagram of the GPS signal data converter device of FIG. 1.

A functional block diagram of the GPS SDC device configured as a sidehat module for connection to radio 20 (or another device) is depicted in FIG. 4. The GPS SDC sidehat module 2 includes a signal processor 60 that communicates with the radio 20 via the connection port 5 connected on mounting plate 4, where the radio 20 provides electrical power (e.g., +13V DC power) and output signals in an RS-232 specification or standard to the processor 60, the output signals including GPS information in a particular format (e.g., an MGRS format). The processor can be of any suitable type and have any suitable configuration and include any suitable software that facilitates performance of the processor in the manner described below.

The radio also provides a 1 PPS (pulse per second) electrical signal via the connection port on mounting plate 4 that is transmitted directly to each of the six ports P1-P6 (which are configured as 15 pin serial ports 8 as described above and depicted in FIGS. 1-3) in order to avoid any latency and to ensure precise timekeeping and synchronizing of signals transmitted between the GPS SDC sidehat module 2 and other devices connected to one or more ports P1-P6 of the module 2.

The processor 60 is also connected to each of ports P1-P6 and is configured to communicate with devices connected to the ports in multiple formats. In particular, the processor 60 connects with each port P1-P6 via a first connection (a first electrical bus that links each port with the processor) at which GPS information is transmitted using an RS-232 specification or standard, and the processor 60 also connects with each port P1-P6 via a second connection (a second electrical bus that links each port with the processor) at which GPS information is transmitted using an RS-422 specification or standard.

As previously noted, the GPS SDC device can be configured as a standalone device, and the block diagram of FIG. 4 shows an optional internally embedded GPS information source device 62 such as an internal GPS receiver (e.g., an embedded SAASM (Selective Availability/Anti-Spoofing Module) GPS receiver commercially available from ITT Communications Systems, USA) and/or an inertial navigation subsystem which can provide the GPS information to the processor 60. In the standalone embodiment, the GPS SDC device can also include an external cable that connects with a power source and/or internal battery that provides electrical power for operation of the device. In addition, in the standalone embodiment, the processor 60 can be configured to provide the 1 PPS signal to the ports P1-P6.

When a device is connected to any of the serial ports P1-P6 (depicted as ports 8 in FIGS. 1-3), the GPS SDC detects the device or a request for GPS information and a "handshaking" process is initiated to tell the processor 60 what message format is required on that port, followed by the processor 60 obtaining the GPS information from the radio 2 (or the internally embedded GPS receiver 62 when the GPS SDC device is a standalone unit) and converting the GPS information to the appropriate format prior to providing such GPS information to the device. A flowchart of the process for detecting/identifying a device connected at a port P1-P6 and also the format of the GPS information to be provided to such port is depicted in FIG. 5.

Figure 5:
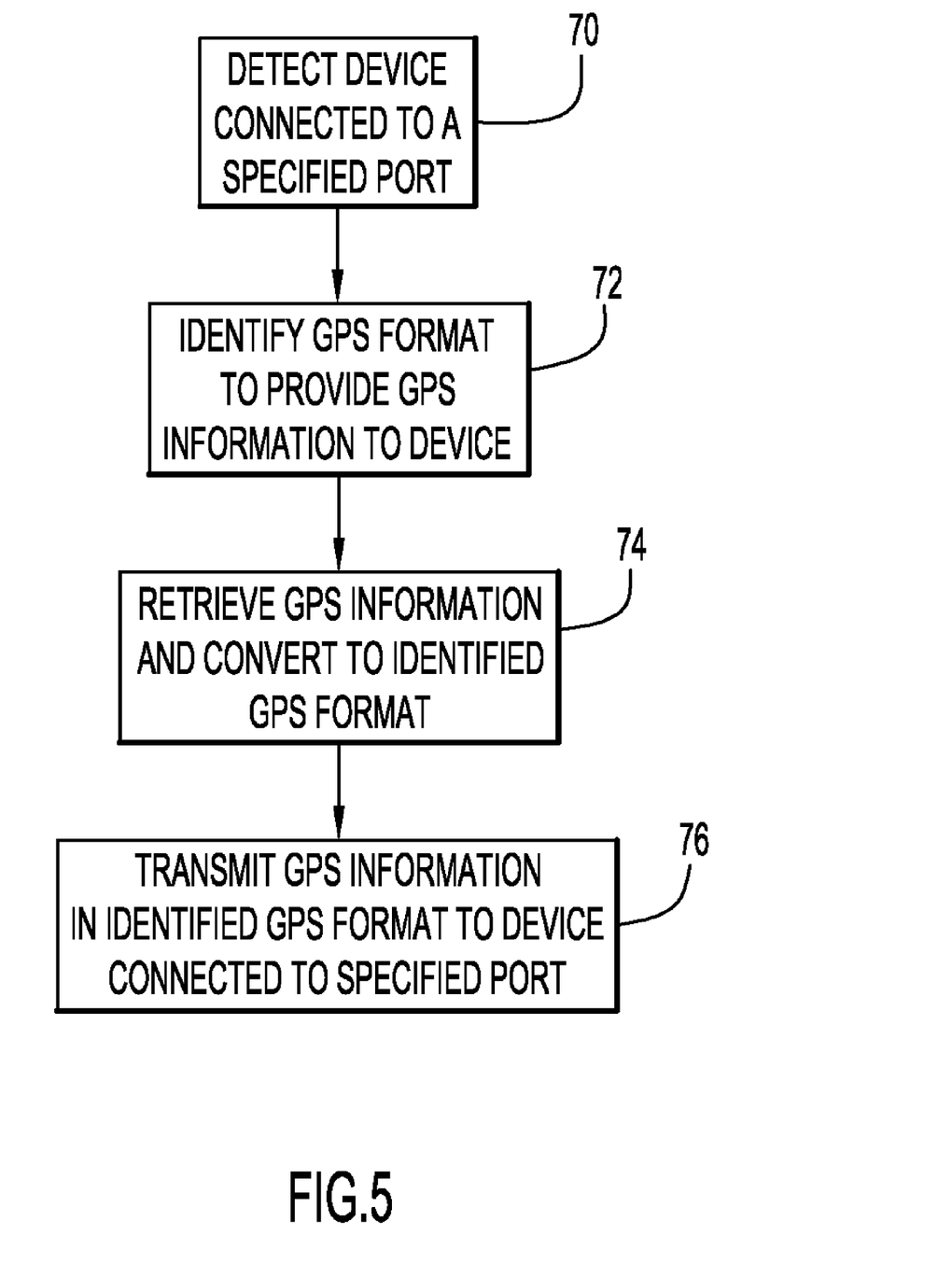
FIG. 5 is a procedural flowchart depicting the manner in which the GPS signal data converter device of FIG. 1 detects and provides GPS data to another device connected with the GPS signal data converter device.

In particular, the processor 60 detects when an auxiliary device is connected to a specific port (step 70 of FIG. 5). For example, the auxiliary device connecting at one of the ports P1-P6 can send a signal that is detected by the processor so as to identify the specific port to which the auxiliary device is connected. When the GPS SDC device determines that an auxiliary device is connected to one of its ports P1-P6, a "handshaking" process is conducted so that the GPS SDC device can ultimately identify the GPS format with which to provide GPS information to the auxiliary device (step 72 of FIG. 5). In the "handshaking process", which involves an exchange of data signals between the processor 60 and the auxiliary device, the processor 60 can identify the specific type of auxiliary device connected to the port (e.g., by an identification signal provided by the auxiliary device to the processor 60) or simply the type of GPS format being requested by the auxiliary device. The auxiliary device connected with the GPS SDC device 2 can be configured to accept GPS information in one or a number of different formats, where the specific format in which GPS information is provided can be determined by the processor 60 or by the identification signal being transmitted by the auxiliary device to the processor 60. The GPS SDC device 2 can further determine from the "handshaking" process the signal standard at which to provide the GPS information in the determined format. In the embodiment described above, the processor 60 is configured to provide GPS information to the ports P1-P6 using an RS-232 standard and also an RS-422 standard. However, it is noted that the processor can also be configured to provide GPS information to the ports using any one or more other established electronics industry standards (e.g., other standards as established by the Electronics Industries Association (EIA)).

The processor 60 retrieves GPS information from the radio 20 (or GPS receiver 62 embedded within the GPS SDC device 2) and, if required, converts the GPS information from one format to the identified format as specified by the auxiliary device attached to one of the ports P1-P6 of the device 2 (step 74 of FIG. 5). Conversion of GPS information from one format to another (e.g., from MGRS format to Lat/Long or UTM formats) can be accomplished utilizing any conventional or other suitable technique. The GPS information is then provided to the auxiliary device in the identified format to the specified port to which the auxiliary device is connected (step 76 of FIG. 5).

An example of the operation of the GPS SDC device is described as follows. An auxiliary device is attached to the P1 port (one of the ports 8 on the front panel 6 of device 2 as shown in FIG. 1). The GPS SDC device 2, which is configured as a sidehat module and connected to radio 20 as shown in FIG. 2, detects the auxiliary device at port P1 and determines from the "handshaking" process that the GPS information is to be provided to the auxiliary device in UTM format using an RS232 standard. A 1 PPS input signal is provided from radio 20 to synchronize the exchange of data with the auxiliary device connected at port P1. The GPS SDC device 2 receives GPS information from the radio 20 in MGRS format using an RS-232 standard. The GPS information is converted by processor 60 from the MGRS format to the UTM format as required by the auxiliary device, and the GPS information is then transmitted to the port P1 in the UTM format at the RS-232 standard.

The processor 60 is configured to provide GPS information to auxiliary devices simultaneously to each of ports P1-P6 and in as many as six different formats and/or at RS-232 or RS-422 standards. For example, the processor 60 can provide GPS information in the MGRS format and RS-232 standard to a first auxiliary device connected at port P1 while simultaneously providing GPS information in the UTM format and RS-422 standard to a second auxiliary device connected at port P2. In another example, GPS information can be simultaneously provided by the processor 60 of GPS SDC device 2 to three or more auxiliary devices connected at three or more of the ports P1-P6 using the same GPS format, two different GPS formats, or even three or more different GPS formats.

It will be appreciated that the embodiments described above and illustrated in the drawings represent only a few of the many ways of implementing a GPS SDC device for simultaneously providing GPS information in multiple formats to different devices.

The signal processor of the GPS SDC device may be implemented by any quantity of any conventional or other processor, controller and/or processing circuitry to perform the receiving and processing/converting of GPS signals as well as detection/identification of devices connected with the GPS SDC device and/or the format of GPS information to be provided to a specified serial port of the GPS SDC device. Incoming signals to the GPS SDC device may be digitized as necessary within the signal processor, or the GPS SDC device may include any quantity of any conventional or other components to perform the conversion (e.g., A/D converter, etc.). The signal processor may perform the signal detection on an incoming signal at any desired frequency (e.g., carrier signal or hop frequency, intermediate frequency, baseband frequency, etc.).

The various functions of the signal processor (e.g., signal detection, etc.) may be distributed in any fashion among any quantity of hardware and/or software modules, processors or other processing devices or circuits (e.g., the functions may distributed in any fashion between the signal processor and controller, etc.). Further, the various signal detection functions may be distributed in any fashion among any quantity of hardware and/or software modules, processors or other processing devices or circuits. The signal processor may perform any desired mathematical operations for any types of operands (e.g., scalars, vectors, matrices, etc.). The signal detection may be performed within any suitable communication device components (e.g., receiver, controller, signal processor, etc.), or be implemented as a stand-alone processing unit within the communication device.

The software used by the GPS SDC device of the present invention (e.g., signal processor, signal detection, etc.) may be implemented in any suitable computer language, and could be developed by one of ordinary skill in the computer and/or programming arts based on the functional description contained herein and the diagrams illustrated in the drawings. Further, any references herein of software performing various functions generally refer to processors performing those functions under software control. The software and/or algorithms described above and illustrated in the diagrams may be modified in any manner that accomplishes the functions described herein. The software may also be available individually, or in any combination, on a recordable medium (e.g., magnetic or optical mediums, magneto-optic mediums, floppy diskettes, CD-ROM, DVD, memory devices (e.g., cards, ROM, RAM, Flash, etc.), etc.), and/or may be downloaded (e.g., in the form of carrier waves, packets, etc.) to systems and/or communication devices via a network or other communications medium.

The GPS SDC device can be configured as a standalone unit having an internal GPS receiver or card and its own power source (e.g., battery or external power cord). Alternatively, the GPS SDC device can be used in combination with another device, in which the GPS SDC device receives power and/or GPS information from the other device. For example, the GPS device can be configured to receive GPS information from an external GPS source such as a Defense Advanced GPS Receiver (DAGR) or a Precision Lightweight GPS Receiver (PLGR). As a standalone unit, the GPS SDC device can be configured to provide GPS information in multiple formats (e.g., at least three different formats, and preferably at least six different formats) to different auxiliary devices connected with the GPS SDC device.

The GPS SDC device of the present invention can be configured to have a suitable configuration and dimensions for use as a sidehat module for connection with a SINCGARS radio and provide a plurality (e.g., at least three and preferably at least six) different GPS formats simultaneously to devices connected to the GPS SDC device. The format types can be user selectable and new formats can be added via software field upgrades. The multiple GPS formats provided by the GPS SDC device eliminates the necessity for multiple GPS devices in a single platform or installation. The GPS SDC sidehat module connected with a SINCGARS radio (as depicted in FIG. 2) fits within conventional SINCGARS vehicle installation space and power footprint specifications, thereby saving space on the vehicle. Logistical issues are reduced, since the number of GPS devices to be maintained is drastically reduced (i.e., battery replacements, maintenance, etc). In addition, as noted above, the GPS SDC device of the invention is not limited to connection with a SINGCARS radio, but rather can be connected with any selected number and types of different communication and/or other electronic equipment.

In addition, the GPS SDC device of the present invention can be used in a variety of applications including, without limitation, military (army, national guard, navy, air force, joint forces) and civilian (homeland defense, public safety, police, fire, emergency rescue, Red Cross, etc.). Vehicles with multiple systems requiring GPS, static locations for military (TOC, NOC, etc.) and civilian (Mobile command stations, roadblocks, etc.) with multiple systems requiring GPS would benefit from the GPS SDC system of the invention.

Having described exemplary embodiments of GPS SDC device for providing GPS signals to a plurality of connection ports, variations and changes will be suggested to those skilled in the art in view of the teachings set forth herein. It is therefore to be understood that all such variations, modifications and changes are believed to fall within the scope of the present invention as defined by the appended claims.

What is claimed:

1. A global positioning system (GPS) signal data converter (SDC) device comprising:
    a plurality of output ports configured to connect with and transmit GPS information to devices connected with the output ports; and
    a processor configured to receive GPS information, to convert the GPS information for output into a plurality of GPS formats, and to transmit the GPS information to at least two output ports in a first GPS format and a second GPS format that is different from the first GPS format.

2. The device of claim 1, wherein the processor is further configured to transmit the GPS information to at least three output ports in the first GPS format, the second GPS format and a third GPS format that is different from each of the first and second GPS formats.

3. The device of claim 1, wherein the plurality of output ports comprises fifteen pin serial ports arranged along a panel of the device.

4. The device of claim 1, wherein the device includes six output ports, and the processor is configured to simultaneously provide GPS information to all six output ports in at least the first and second GPS formats when devices are connected to each output port.

5. The device of claim 1, further comprising an electrical connector that facilitates connection of the device with a communications system, wherein the processor is configured to receive the GPS information from the communications system via the electrical connector.

6. The device of claim 5, further comprising a GPS receiver that provides the GPS information to the processor.

7. The device of claim 1, wherein each of the first and second GPS formats comprises one of a latitude/longitude format, an MGRS format and a UTM format.

8. A communications system for providing global positioning system (GPS) information, the system comprising:
    an electronic component including a GPS receiver that provides GPS information; and
    a GPS signal data converter (SDC) device connected with the electronic component and comprising a plurality of output ports configured to connect with and transmit GPS information to devices connected with the output ports, and a processor configured to receive GPS information from the electronic component, convert the GPS information for output into a plurality of GPS formats, and to transmit the GPS information to at least two output ports in a first GPS format and a second GPS format that is different from the first GPS format.

9. The system of claim 8, wherein the processor of the GPS SDC device is further configured to transmit the GPS information to at least three output ports in the first GPS format, the second GPS format and a third GPS format that is different from each of the first and second GPS formats.

10. The system of claim 8, wherein the plurality of output ports comprises fifteen pin serial ports arranged along a panel of the device.

11. The system of claim 8, wherein the device includes six output ports, and the processor is configured to simultaneously provide GPS information to all six output ports in at least the first and second GPS formats when devices are connected to each output port.

12. The system of claim 8, wherein the GPS SDC device removably connects with the electronic component via an electrical connector located at a rear panel of the GPS SDC device and securing structure located at a front panel of the GPS SDC device such that, when the GPS SDC device is connected with the electronic component, a side surface of the GPS SDC device engages with a side surface of the electronic component.

13. The system of claim 8, wherein each of the first and second GPS formats comprises one of a latitude/longitude format, an MGRS format and a UTM format.

14. The system of claim 8, wherein the electronic component comprises a radio unit.

15. A method of providing global positioning system (GPS) information in a plurality of different GPS formats based upon GPS information received in a single format from a GPS receiver, the method comprising:
    receiving GPS information via a processor of a GPS signal data converter (SDC) device;
    converting the GPS information for output into a plurality of different GPS formats using the processor of the GPS SDC device; and
    transmitting the GPS information in a first GPS format to a first output port of the GPS SDC device and the GPS information in a second GPS format to a second output port of the GPS SDC device, wherein the second GPS format is different from the first GPS format.

16. The method of claim 15, wherein the GPS information is further simultaneously transmitted in the first and second formats to first and second outputs of the GPS SDC device and in the third format to a third output of the GPS SDC device, and third GPS format is different from each of the first and second GPS formats.

17. The method of claim 15, wherein the GPS SDC converter includes six output ports, and the processor of the GPS SDC converter is configured to simultaneously provide GPS information in at least three different GPS formats to the six output ports.

18. The method of claim 15, wherein the GPS information is provided to the processor via a GPS receiver disposed within the GPS SDC converter.

19. The method of claim 15, further comprising:
    connecting the GPS SDC device with an electronic component such that the GPS information is provided by the electronic component to the GPS SDC device.

20. The method of claim 19, wherein the GPS SDC device is connected to the electronic component via an electrical connector located at a rear panel of the GPS SDC device and securing structure located at a front panel of the GPS SDC device such that a side surface of the GPS SDC device engages with a side surface of the electronic component.

21. The method of claim 19, wherein the electronic component comprises a radio unit.

22. The method of claim 15, wherein each of the first and second GPS formats comprises one of a latitude/longitude format, an MGRS format and a UTM format.

* * * * *